United States Patent
Rutkiewicz

(10) Patent No.: US 11,632,506 B2
(45) Date of Patent: Apr. 18, 2023

(54) NON-UNIFORMITY CORRECTION (NUC) SELF-CALIBRATION USING IMAGES OBTAINED USING MULTIPLE RESPECTIVE GLOBAL GAIN SETTINGS

(71) Applicant: Simmonds Precision Products, Inc., Vergennes, VT (US)

(72) Inventor: Robert D. Rutkiewicz, Edina, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 17/374,661

(22) Filed: Jul. 13, 2021

(65) Prior Publication Data

US 2023/0019063 A1    Jan. 19, 2023

(51) Int. Cl.
    H04N 5/355    (2011.01)
    H04N 5/357    (2011.01)
    (Continued)

(52) U.S. Cl.
    CPC ......... H04N 5/35536 (2013.01); F42B 15/01 (2013.01); G06T 7/80 (2017.01);
    (Continued)

(58) Field of Classification Search
    CPC ...... H04N 5/35536; H04N 5/33; H04N 5/357; H04N 5/378; F42B 15/01; G06T 7/80
    (Continued)

(56) References Cited

U.S. PATENT DOCUMENTS

| 5,960,097 A | 9/1999 | Pfeiffer et al. |
| 8,428,385 B2 | 4/2013 | Whiteside et al. |

(Continued)

FOREIGN PATENT DOCUMENTS

| CN | 106485683 A | 3/2017 |
| CN | 108225571 A | 6/2018 |
| WO | 2011/086433 A1 | 7/2011 |

OTHER PUBLICATIONS

Battaglia Jesse et al.: "Parameterized nonuniformity corrections (NUC) for non-temperature stabilized InGaAs SWIR sensing", Spie Smart Structures and Materials + Nondestructive Evaluation and Health Monitoring, 2005, San Diego, California, United States, vol. 7660, Apr. 23, 2010 (Apr. 23, 2010), pp. 1-13, XP055978598, Doi: 10.1117/12.852597 ISBN: 978-1-5106-4548-6.

(Continued)

*Primary Examiner* — Usman A Khan
(74) *Attorney, Agent, or Firm* — Locke Lord LLP; Joshua L. Jones; Gabrielle L. Gelozin

(57) ABSTRACT

A non-uniformity correction (NUC) calibration method comprises obtaining image data for a plurality of images with an image sensor, wherein each image in the plurality of images is obtained at a different respective global pixel gain setting and global expose in the image sensor; and using the image data for non-uniformity correction calibration to compute pixel NUC values for the pixels in the image sensor. The method can further include storing the pixel NUC values and obtaining further image data corrected by the stored pixel NUC values. In embodiments, the method can include moving a platform based on the further image data. In certain embodiments, the platform can be a guided munition.

19 Claims, 3 Drawing Sheets

(51) Int. Cl.
  *H04N 5/33* (2006.01)
  *F42B 15/01* (2006.01)
  *H04N 5/378* (2011.01)
  *G06T 7/80* (2017.01)

(52) U.S. Cl.
  CPC .............. *H04N 5/33* (2013.01); *H04N 5/357* (2013.01); *H04N 5/378* (2013.01)

(58) Field of Classification Search
  USPC ........................................................ 348/308
  See application file for complete search history.

(56) References Cited

U.S. PATENT DOCUMENTS

| | | | |
|---|---|---|---|
| 8,872,111 | B2 | 10/2014 | Burkland |
| 10,798,309 | B2 | 10/2020 | Mercier et al. |
| 2009/0257679 | A1* | 10/2009 | Hogasten ............. H04N 5/3656 |
| | | | 382/275 |
| 2011/0041720 | A1* | 2/2011 | Brill ......................... F42C 9/16 |
| | | | 102/266 |
| 2011/0108717 | A1 | 5/2011 | Olson et al. |
| 2019/0116328 | A1* | 4/2019 | Dock ........................ G01J 5/10 |

OTHER PUBLICATIONS

Lasarte De M et al.: "Optimized Algorithm for the Spatial Nonuniformity Correction of an Maging System Based On a Charge-Coupled Device Color Camera", Applied Optics, Optical Society of America, Washington, DC, US, vol. 46, No. 2, Jan. 10, 2007 (Jan. 10, 2007), pp. 167-174, XP001503826, ISSN: 0003-6935, DOI: 10.1364/AO.46.000167.

European Search Report issued in corresponding European Patent Application No. 22184796.5 dated Nov. 16, 2022.

* cited by examiner

NON-UNIFORMITY CORRECTION (NUC) SELF-CALIBRATION USING IMAGES OBTAINED USING MULTIPLE RESPECTIVE GLOBAL GAIN SETTINGS

BACKGROUND

1. Field

The present relates generally to imaging technology, and more particularly to non-uniformity correction (NUC) in imaging systems such as used in SWIR seekers.

2. Description of Related Art

There is need to have a NUC calibration performed in completed fielded SWIR Seekers. The SWIR seeker has a technical risk of the NUC changing after a gun launch shock or other shocks. There is also the potentially higher than typical temperature ranges that may exceed the standard temperature range for the initial test bench NUC. Both risks need to assess the change or ideally update the values used to compensate for changes to the pixel Non-Uniformity. This disclosure provides a solution for these needs.

SUMMARY

A non-uniformity correction (NUC) calibration method comprises obtaining image data for a plurality of images with an image sensor, wherein each image in the plurality of images is obtained at a different respective global pixel gain setting and global expose time in the image sensor; and using the image data for non-uniformity correction calibration to compute pixel NUC values for the pixels in the image sensor. The method can further include storing the pixel NUC values and obtaining further image data corrected by the stored pixel NUC values. In embodiments, the method can include moving a platform based on the further image data. In certain embodiments, the platform can be a guided munition.

In embodiments, obtaining image data and using the image data for non-uniformity correction calibration can be performed onboard a guided munition seeker while the guided munition seeker is in transit and actively seeking a target. In certain embodiments, the NUC calibration can be performed using images obtained with an imaging device onboard the guided munition seeker without any darkening of an optical path through the imaging device.

In embodiments, obtaining image data further includes performing a control algorithm, where the control algorithm including setting a readout integrated circuit global control to a respective gain or expose duration setting before each image is obtained and storing to a memory pixel values for each obtained image with the respective gain setting. The control algorithm can include increasing the respective gain and/or exposure time setting and storing to memory pixel values for each obtained image with the increased respective gain setting.

The control algorithm can include increasing the respective gain and/or exposure time setting and storing to memory pixel values for each obtained image with each subsequent increased respective gain setting until maximum gain setting is reached, where maximum gain is reached when noise saturates pixels A/D value. In embodiments, the method can include performing the control algorithm for 11 levels of illumination.

In embodiments, using the image data for non-uniformity correction can include performing a process pixel data algorithm, the process pixel data algorithm including computing a noise floor at a zero gain setting, obtaining a frame average of all pixels at zero gain setting, and computing a respective pixel's zero gain bias correction by calculating a difference between pixel average value and frame average value. The process pixel data algorithm can include zero bias correcting all collected pixel data.

The process pixel data algorithm can include computing de-speckle pixel correction values on all pixel zero bias corrected pixel data and ignoring saturated pixels. The process pixel data algorithm can include computing bias and scale factor linear fit values between de-speckle correction values and pixel value from all respective gain settings. The process pixel data algorithm can include storing the zero bias, fitted bias, and scale factor values as NUC correction values for each pixel in the obtained image. In embodiments, the method can further include performing the process pixel data algorithm for 11 levels of illumination.

An imaging system for non-uniformity correction (NUC) calibration, comprises an imaging device, a photodetecting sensor operatively connected to the imaging device, an readout integrated circuit (ROIC) operatively connected to receive pixel photoelectrons from the photodetecting sensor, and a processor containing a ROIC controller operatively connected to the integrated circuit, the integrated circuit controller having machine readable instructions configured to control pixel gain settings and exposure times.

In embodiments, the machine readable instructions can be further configured to perform a method, the method comprising obtaining image data for a plurality of images with an image sensor, wherein each image in the plurality of images is obtained at a different respective global pixel gain setting in the image sensor and using the image data for non-uniformity correction to compute pixel NUC values for the pixels in the image sensor. In certain embodiments, the photodetecting sensor can be sensitive to short-wave infrared (SWIR) wavelengths. In certain embodiments, the imaging system can be included in a moving imaging platform.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
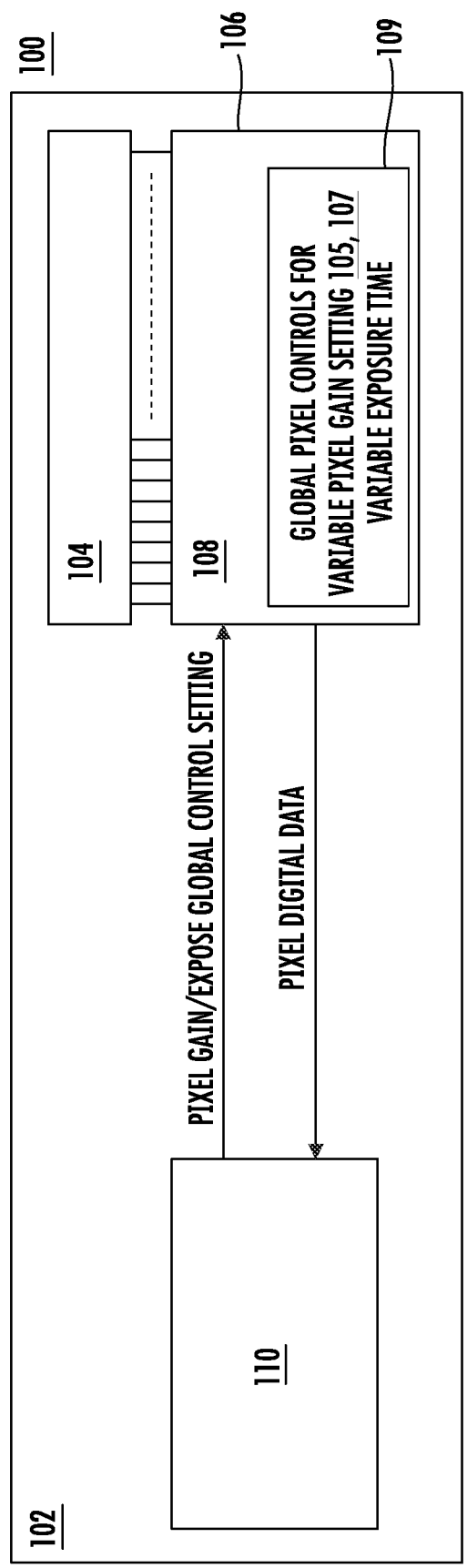
FIG. 1 is a schematic view of an embodiment of a imaging device constructed in accordance with the present disclosure, showing communication between the imaging device and an integrated circuit controller.
Figure 2:
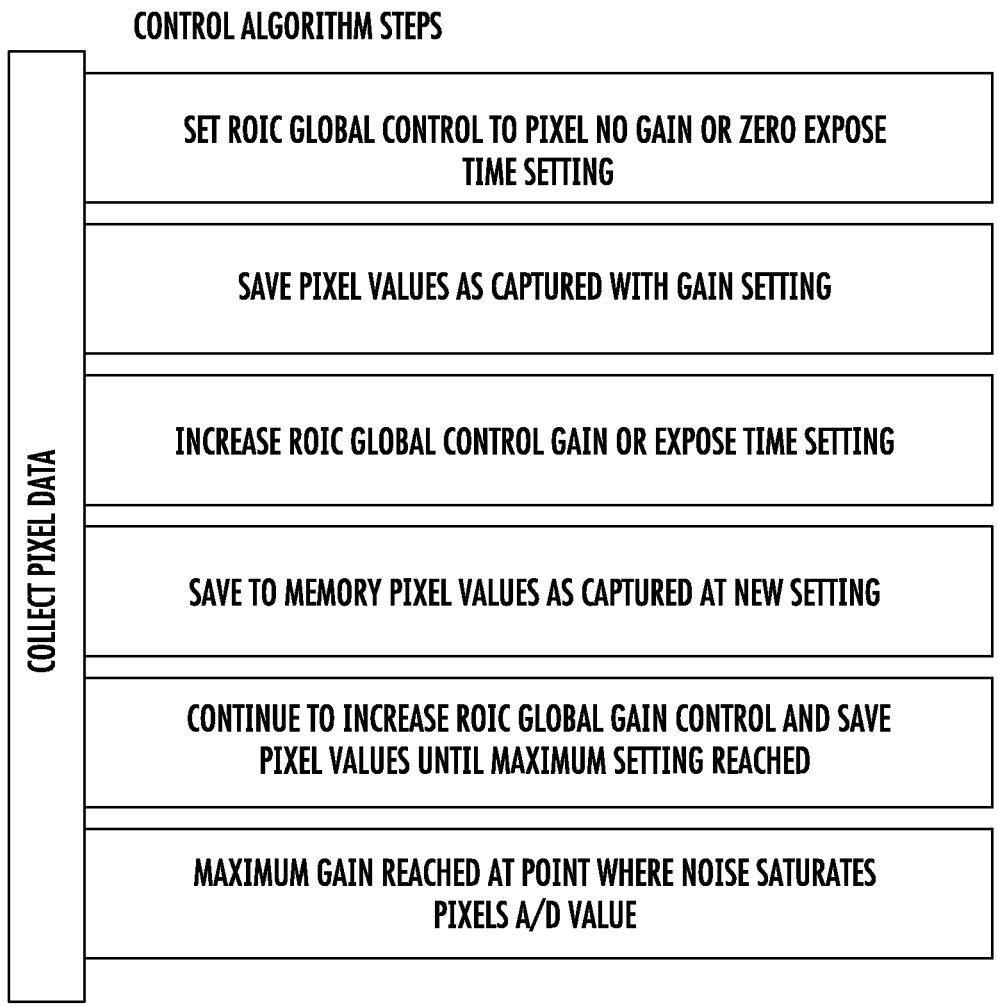
FIG. 2 is a flow diagram of a control algorithm.
Figure 3:
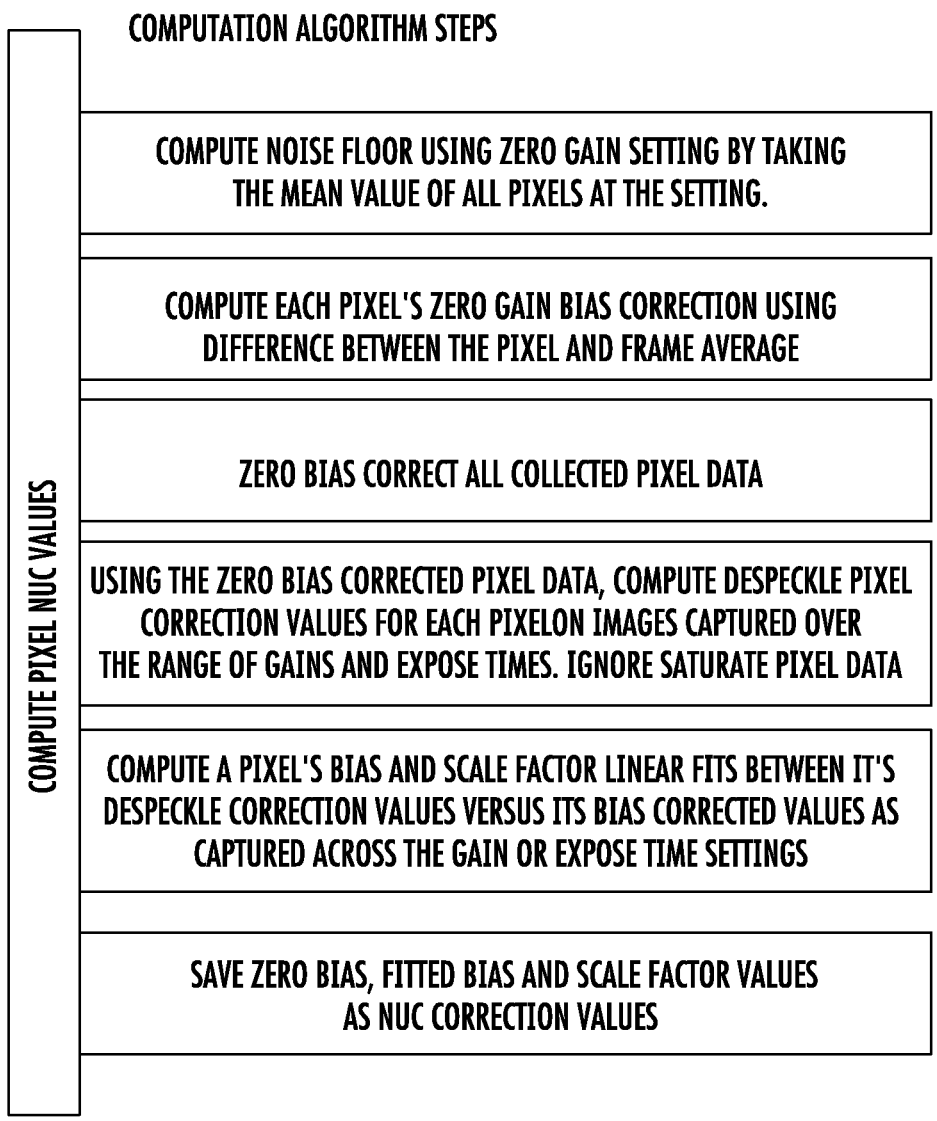
FIG. 3 is a flow diagram of a process pixel data algorithm.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to perform NUC calibration in the field.

There is a need to have a NUC calibration performed in completed fielded SWIR Seekers, for example after exposure to mechanical shock or performance degrading high temperatures. Seekers can use a short-wave infrared (SWIR) focal plane array (FPA) as a photodetection sensor to function for image scene capture. In a seeker it is critical for representative images to be consistent frame to frame with uniform performance, pixel to pixel. To help ensure this, seekers perform non-uniformity correction (NUC) calibration by collecting calibration data and then process the data to compute correction to ensure that a given intensity of light has the same value as it pans across the array. NUC calibration is typically performed in a controlled environment, for example using controlled light sources and temperature chamber to collect the necessary data. However this process can be time consuming and must be performed in a calibration lab.

Even in a lab, NUC calibration can be difficult to perform given the factors that impact an individual pixels measured value. At a minimum, measurements must be taken at two signal intensities, however more signal levels provide better input. The imaging system 100, and the method it performs, allows for in the field NUC calibration with many more than two signal intensities.

The calibration data can be used to derive pixel correction values that are then applied for every new frame capture. The corrections can be parameterized over temperature and typically have bias and scale factor correction values. These processes store the corrections values during seeker hardware production in non-volatile memory, which are then retrieved and used to correct each frame of pixel data during operation. But these methods create challenges with respect to changes in the non-uniformity performance due to environment exposure. For example, a large mechanical shock changes electrical connections between the photodetector and the integrated circuit, impacting the individual pixel's response. Additionally, the extended time required to collect data during the manufacturing that prevents easy transition to higher production rates.

The imaging system 100 for non-uniformity correction (NUC) calibration includes an imaging device 102 and a photodetecting sensor 104 (e.g. a uniform InGaAs photodetector) operatively connected to the imaging device (e.g. a moving imaging platform such as a guided resource or munition). In certain embodiments, the photodetecting sensor 104 can be sensitive to short-wave infrared (SWIR) wavelengths. The system 100 can use the capabilities and functions specific to the sensor 104, which in certain embodiments can be a Sensors Unlimited sensor, as that incorporated in camera SU640CSX, having a buffered gate modulated, B-GMOD, pixel amplifier 105. An integrated circuit 106 (e.g. a read out integrated circuit (ROIC)) 106 is operatively connected to receive pixel photoelectrons 108 from the photodetecting sensor 104. More specifically, the ROIC 106 converts the photoelectrons collected at the pixel location over the expose time into a representative digital number. The ROIC 106 can include pixel amplifiers 105, analog to digital converter (A/D) circuits 107, and ROIC control circuits 109 to set the amplifier gain and the expose time. The processor 110 runs as a controller, and performs mathematical calculations and steps through the calibration algorithm. Processor 110 controller interface is operatively connected to the ROIC 106, having machine readable instructions configured to enable the system to provide global shutter, global gain control, and global expose time, so that the controller 110 can set all pixels to be collecting the scene with a common performance, described further below.

In certain embodiments, the B-GMOD amplifier 105 can be a variable gain circuit, and there can be one amplifier 105 per pixel. The amplifier 105 responds to photoelectrons generated within the photodetector 104 with a multiplier effect generating an output increasing the effective number of electrons and allowing to be converted in the A/D converter 107. Changing the value in a control register changes the voltage reference used in setting pixel amplifier gain, which is a global change in gain. Each component of the pixel circuit all contribute to performance differences between pixels. The calibration captures the effects of all the variation sources. All pixel variations are created within the ROIC circuits or the pixel bumps that are used to mate with the ROIC controller 110.

In embodiments, the machine readable instructions can be further configured to perform a method, including obtaining image data for a plurality of images with the image sensor 104. The method can include varying the number of electrons generated for different rates. For example, in a standard process, a fixed gain is used and then the incoming illumination is varied to change the number of photoelectrons generated. The combination of constant gain and varying input electrons measures how the individual pixel capture and gain varies from its neighbors. The linear performance of converting photoelectrons into counts enables calibration independent of the quantity of photoelectrons generated by the photodetector 104. This is evident where a below average conversion at 20% illumination has proportionally the same below average performance at 80% illumination. Either the 20% or 80% or other level of illumination is sufficient to measure individual pixel performance compared to the average pixel performance. Expose time changes can vary the number of photoelectrons entering the pixel amplifier and allows measurement of all downstream conversion to a number. Changing the global gain measures the responsivity of the pixel amplifier, changes the number of amplifier output electrons and allows measurement downstream conversion to a number.

The linear performance of the pixel amplifier makes changing the expose time interchangeable with changing the gain to generate the input data for this calibration. Using this characteristic, the system 100 and ROIC controller 110 instead generate the varying performance data by allowing use of one illumination level and changing the gain and expose time to different settings. This also generates a map of pixel gain variation and the sources of variation between pixels are independent of the gain setting. Thus, it is possible to plot variation as proportional to raw number independent of the gain used.

Because the ROIC 106 captures each pixel's raw value with a common gain setting and common expose start and stop time, this removes common variation sources. This enables an assumption to be made that an individual pixel value should be the average of its immediate neighboring pixels. In certain instances, some pixel corrections are so high that a first pass to find corrections for these outlier pixels is needed. If left unchecked, the intense corrections could corrupt the respective input values then used to correct the neighboring pixels.

Each image in the plurality of captured images can be obtained at a different respective global pixel gain setting in the image sensor, e.g. using a control algorithm, and using the image data for non-uniformity correction to compute pixel NUC values for the pixels in the image sensor, e.g. using a process pixel data algorithm.

The control algorithm, e.g. for obtaining image data, can further include setting a readout integrated circuit global control to a respective gain setting before each image is obtained and storing to a memory pixel values for each obtained image with the respective gain setting (e.g. the first one is zero pixel gain and/or zero exposure time). Specifically, capturing bias at zero light input, by setting global gain at lowest setting and shortest exposure time, and applying zero light correction to all following image capture.

The control algorithm can include increasing the respective gain and/or exposure time setting and storing to memory pixel values for each obtained image with the increased respective gain setting. Lengthening expose time with motion can blur the input image, but long expose time can also provide a common level of lighting across the array for performing as an integration sphere. It is contemplated performing as an integration sphere may be omitted from the algorithm without departing from the scope of this disclosure. An individual pixel correction is computed for the image using one pass to identify pixels with high correction values. Correction values are applied and a second pass is used to compute correction for the remaining pixels. All pairs of the correction value and raw pixel value are saved to memory. The level for the high correction cutoff is dependent on the needed pixel uniformity and the number of neighbor pixels used for determining average illumination. For example, a computation using one hundred neighboring pixels and a cutoff that is ten percent of the full range negatively impacts the correction by one part in a thousand of its neighbor pixels.

The control algorithm can include repeating the above steps and collecting and storing data pairs until the majority of pixels have raw values indicating saturation (e.g. until noise saturates the pixel's A/D value) by increasing the respective gain and/or exposure time setting, and storing to memory pixel values for each obtained image with each subsequent increased respective gain setting. In embodiments, the method can include performing the control algorithm for 11 levels of illumination, however any suitable number of illumination levels can be used without departing from the scope of this disclosure.

Performing the process pixel data algorithm, e.g. using the image data for non-uniformity correction, can include computing a noise floor at a zero gain setting, obtaining a frame average of all pixels at zero gain setting, and computing a respective pixel's zero gain bias correction by calculating a difference between pixel average value and frame average value. The process pixel data algorithm can include zero bias correcting all collected pixel data.

The process pixel data algorithm can include computing de-speckle pixel correction values on all pixel zero bias corrected pixel data and ignoring saturated pixels. The process pixel data algorithm can include computing bias and scale factor linear fit values between de-speckle correction values and pixel value from all respective gain settings, where the correction value is used as the Y term, and raw pixel value is used as the X term. Only raw values that are in the linear range between the min and max linear response range should be used as values with non-linear response is difficult to fit and non-linear response below the minimum has little effect on the correction.

The values obtained for uniformity correction have varying impact dependent on the illumination level. There is the zero bias correction range, a linear fit range and a non-linear saturation range. The calibration uses correction values based on normalized scaling where raw pixel values are scaled from zero to one hundred percent of the sensor range. Scale factor correction values are scaled by a value running from zero to one. The zero light bias correction is all the correction needed for the low illumination scenes or image regions. At this illumination, the raw light count that is equivalent to a few percent of the sensitivity range correction result that is only a few percent of the computed correction value, meaning non-linearity has a factional effect. The fractional effect on a value that is only a few percent of the scale factor correction value is effectively within the noise floor of the raw value. A scale factor correction count of fifty multiplied by five percent is a scale factor correction of two or three. This value is small compared for the pixel values running from zero to two thousand.

The linear fitted range has both the zero light bias and the fitted bias applied to the raw pixel value, it multiplies the fitted scale factor value by the normalized light value which is then applied to the raw pixel value.

Non-linearity above the maximum imposes a restriction on the useful raw count value range so raw pixel value above the maximum value are marked as an invalid value, however, this has no effect in actual operation as images are captured at multiple gains. Pixel values that are invalid at one gain can still be valid at lower global gain setting. The process pixel data algorithm can include storing the zero bias, fitted bias, and scale factor values as NUC correction values for each obtained image.

The method can further include storing the pixel NUC values and obtaining further image data corrected by the stored Pixel NUC values. During normal operation, the NUC can be applied and the correction values the stored in the memory with the NUC value for built in test function. In embodiments, the method can include moving a platform based on the image data, where the platform can be a guided munition.

In embodiments, obtaining image data and using the image data for non-uniformity correction calibration can be performed onboard a guided munition seeker while the guided munition seeker is in transit and actively seeking a target. In certain embodiments, the NUC calibration can be performed using images obtained with an imaging device onboard the guided munition seeker without any darkening of an optical path through the imaging device (e.g. without an SLM or other black-out or gray-out devise in the optical path). It is contemplated that ambient light, a moving scene, or a blur scene can be used. In certain instances, blurred scenes may be better because should be no speckle pattern.

The methods and systems of the present disclosure, as described above and shown in the drawings, provide for computing new NUC values after an environmental shock shift the values needed to correct the pixel data. This keeps the sensor operating at its optimal performance without need to use large performance tolerances to address shifts after factory NUC calibration. This algorithm can perform built in test on the sensor calibration ensuring the validity of pixel data. The NUC calibration can use data enabling pixel data use on pixels with extreme correction values. The method along with dynamic gain control gathers data using the pixels that would otherwise be considered bad pixels. This provides higher yields for sensor production by allowing marginal pixels to provide data as good as the nominal pixels.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

While the apparatus and methods of the subject disclosure have been shown and described, those skilled in the art will readily appreciate that changes and/or modifications may be made thereto without departing from the scope of the subject disclosure.

What is claimed is:

1. A non-uniformity correction (NUC) calibration method comprising:
   obtaining image data for a plurality of images with an image sensor, wherein each image in the plurality of images is obtained at a different respective global pixel gain setting in the image sensor;
   using the image data for non-uniformity correction to compute pixel NUC values for the pixels in the image sensor;
   storing the pixel NUC values;
   obtaining further image data corrected by the stored Pixel NUC values;
   moving a platform based on the further image data, wherein the platform is a guided munition, wherein obtaining image data and using the image data for non-uniformity correction calibration are performed onboard a guided munition seeker while the guided munition seeker is in transit and actively seeking a target.

2. The method as recited in claim 1, wherein the NUC calibration is performed using images obtained with an imaging device onboard the guided munition seeker without any darkening of an optical path through the imaging device.

3. The method as recited in claim 1, wherein obtaining image data further includes a performing a control algorithm, the control algorithm including:
setting a readout integrated circuit global control to a respective gain or expose duration setting before each image is obtained; and
storing to a memory pixel values for each obtained image with the respective gain setting.

4. The method as recited in claim 3, wherein the control algorithm further includes increasing the respective gain and/or exposure time setting; and
storing to memory pixel values for each obtained image with the increased respective gain setting.

5. The method as recited in claim 4, wherein the control algorithm further includes increasing the respective gain and/or exposure time setting; and
storing to memory pixel values for each obtained image with each subsequent increased respective gain setting until maximum gain setting is reached, wherein maximum gain is reached when noise saturates pixels A/D value.

6. The method as recited in claim 5, wherein the method further includes performing the control algorithm for 11 levels of illumination.

7. The method as recited in claim 1, wherein using the image data for non-uniformity correction includes performing a process pixel data algorithm, the process pixel data algorithm including:
computing a noise floor at a zero gain setting;
obtaining a frame average of all pixels at zero gain setting; and
computing a respective pixel's zero gain bias correction by calculating a difference between pixel average value and frame average value.

8. The method as recited in claim 7, wherein the process pixel data algorithm further includes zero bias correcting all collected pixel data.

9. The method as recited in claim 8, wherein the process pixel data algorithm further includes:
computing de-speckle pixel correction values on all pixel zero bias corrected pixel data; and
ignoring saturated pixels.

10. The method as recited in claim 9, wherein the process pixel data algorithm further includes computing bias and scale factor linear fit values between de-speckle correction values and pixel value from all respective gain settings.

11. The method as recited in claim 9, wherein the process pixel data algorithm further includes storing the zero bias, fitted bias, and scale factor values as NUC correction values for each pixel in the obtained image.

12. The method as recited in claim 11, wherein the method further includes performing the process pixel data algorithm for 11 levels of illumination.

13. A non-uniformity correction (NUC) calibration method comprising:
obtaining image data for a plurality of images with an image sensor, wherein each image in the plurality of images is obtained at a different respective global pixel gain setting in the image sensor; and
using the image data for non-uniformity correction to compute pixel NUC values for the pixels in the image sensor,
wherein obtaining image data further includes a performing a control algorithm, the control algorithm including:
setting a readout integrated circuit global control to a respective gain or expose duration setting before each image is obtained;
storing to a memory pixel values for each obtained image with the respective gain setting;
increasing the respective gain and/or exposure time setting;
storing to memory pixel values for each obtained image with the increased respective gain setting;
increasing the respective gain and/or exposure time setting; and
storing to memory pixel values for each obtained image with each subsequent increased respective gain setting until maximum gain setting is reached, wherein maximum gain is reached when noise saturates pixels A/D value.

14. The method as recited in claim 13, wherein the method further includes performing the control algorithm for 11 levels of illumination.

15. A non-uniformity correction (NUC) calibration method comprising:
obtaining image data for a plurality of images with an image sensor, wherein each image in the plurality of images is obtained at a different respective global pixel gain setting in the image sensor; and
using the image data for non-uniformity correction to compute pixel NUC values for the pixels in the image sensor, wherein using the image data for non-uniformity correction includes performing a process pixel data algorithm, the process pixel data algorithm including:
computing a noise floor at a zero gain setting;
obtaining a frame average of all pixels at zero gain setting; and
computing a respective pixel's zero gain bias correction by calculating a difference between pixel average value and frame average value.

16. The method as recited in claim 15, wherein the process pixel data algorithm further includes zero bias correcting all collected pixel data.

17. The method as recited in claim 16, wherein the process pixel data algorithm further includes:
computing de-speckle pixel correction values on all pixel zero bias corrected pixel data; and
ignoring saturated pixels.

18. The method as recited in claim 17, wherein the process pixel data algorithm further includes computing bias and scale factor linear fit values between de-speckle correction values and pixel value from all respective gain settings.

19. The method as recited in claim 17, wherein the process pixel data algorithm further includes storing the zero bias, fitted bias, and scale factor values as NUC correction values for each pixel in the obtained image.

* * * * *